(12) United States Patent
Kobayashi

(10) Patent No.: US 7,447,124 B2
(45) Date of Patent: Nov. 4, 2008

(54) RECORDING/REPRODUCING DEVICE

(75) Inventor: Shoei Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 301 days.

(21) Appl. No.: 10/275,047

(22) PCT Filed: Feb. 25, 2002

(86) PCT No.: PCT/JP02/01687

§ 371 (c)(1),
(2), (4) Date: May 12, 2003

(87) PCT Pub. No.: WO02/071399

PCT Pub. Date: Sep. 12, 2002

(65) Prior Publication Data

US 2003/0169651 A1 Sep. 11, 2003

(30) Foreign Application Priority Data

Mar. 2, 2001 (JP) .............................. 2001-58846

(51) Int. Cl.
*G11B 7/00* (2006.01)

(52) U.S. Cl. ................ 369/44.26; 369/59.25; 369/53.2; 369/94; 369/275.3

(58) Field of Classification Search .................. 369/94, 369/59.25, 44.13, 47.48
See application file for complete search history.

(56) References Cited

U.S. PATENT DOCUMENTS

| 6,064,639 | A | * | 5/2000 | Sako et al. ............... 369/47.15 |
|---|---|---|---|---|
| 6,172,952 | B1 | * | 1/2001 | Inokuchi et al. .......... 369/47.55 |
| 6,456,584 | B1 | * | 9/2002 | Nagata et al. ............ 369/275.2 |
| 6,511,788 | B1 | * | 1/2003 | Yasuda et al. .......... 430/270.13 |
| 6,751,173 | B1 | * | 6/2004 | Maeda ..................... 369/47.31 |
| 6,894,962 | B1 | * | 5/2005 | Nishiuchi et al. ........ 369/47.51 |
| 2004/0202083 | A1 | * | 10/2004 | Ogawa et al. ............ 369/59.25 |

FOREIGN PATENT DOCUMENTS

| JP | 11-175979 | | 7/1999 |
|---|---|---|---|
| JP | WO0023990 | * | 4/2000 |
| JP | 2000-285469 | | 10/2000 |

* cited by examiner

*Primary Examiner*—Wayne Young
*Assistant Examiner*—Lixi Chow
(74) *Attorney, Agent, or Firm*—Oblon, Spivak, McClelland, Maier & Neustadt, P.C.

(57) ABSTRACT

The present invention relates to a recording and/or reproduction apparatus and a program suitable for use to record or reproduce data onto or from an optical disk having two recording layers on one side thereof.

In an optical disk which has, on one side thereof, two layers including a recording film L0 layer in an unformatted state and another recording film L1 layer in a formatted state, the recording film L0 layer is formatted with marks at step S1, and formation of marks corresponding to recording data is started beginning with the recording film L0 layer at step S2. After the recording film L0 layer is used up, marks corresponding to recording data are formed on the recording film L1 layer at step S3. The present invention can be applied, for example, to a DVD player.

16 Claims, 17 Drawing Sheets

F I G. 2
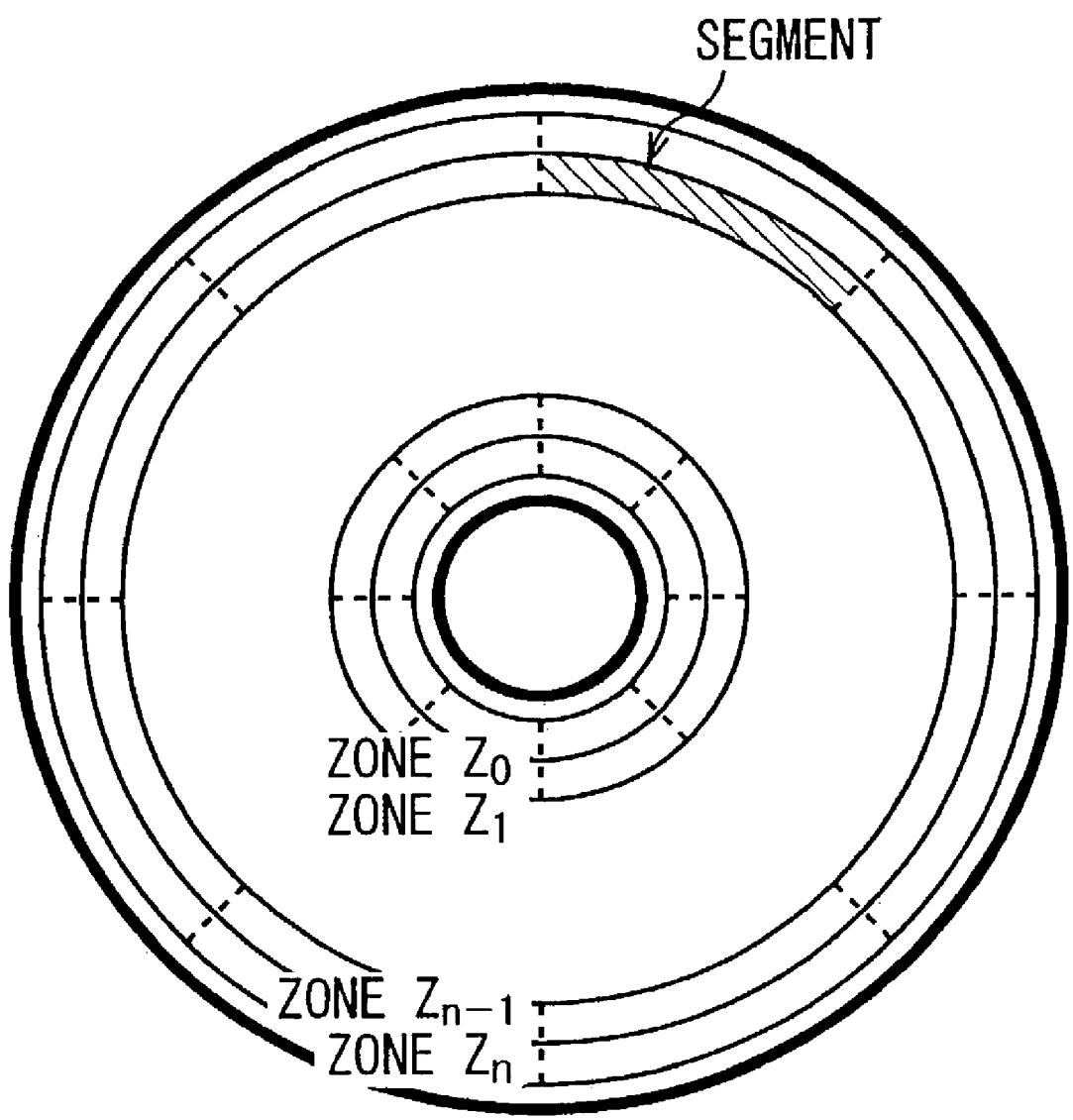

FIG. 3

| SM 60ch | VF01 414ch | PrA1 30ch | AM1 21ch | ID1 102ch | PoA1 6ch | VF02 288ch | PrA12 30ch | AM2 21ch | ID2 102ch | PoA2 6ch |

1080ch

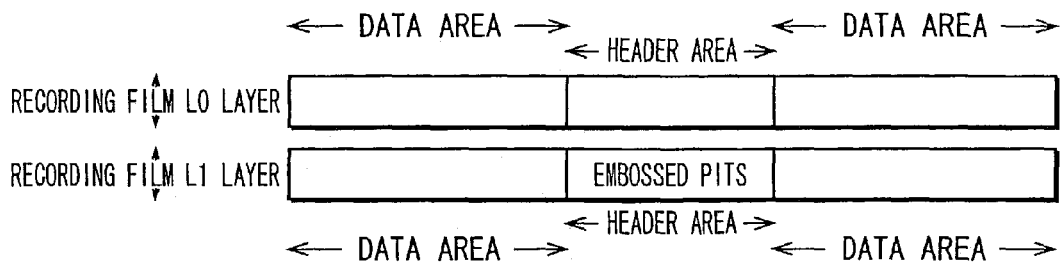
F I G. 1 5 A
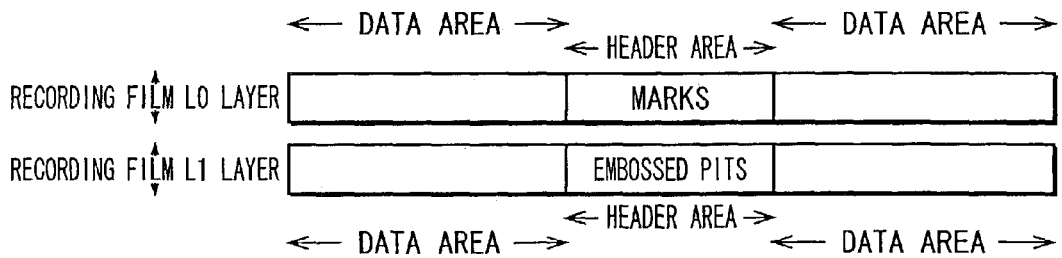
F I G. 1 5 B
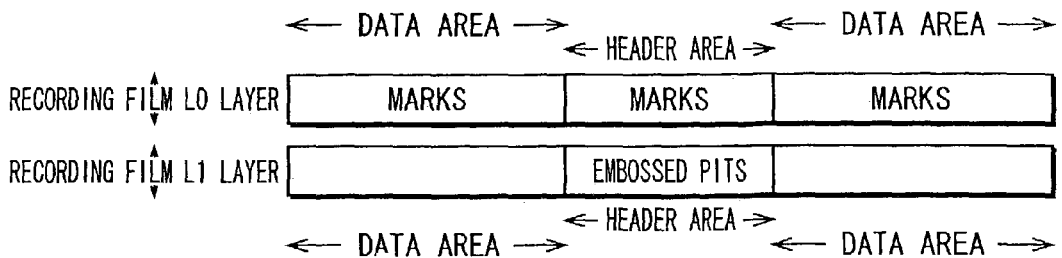
F I G. 1 5 C
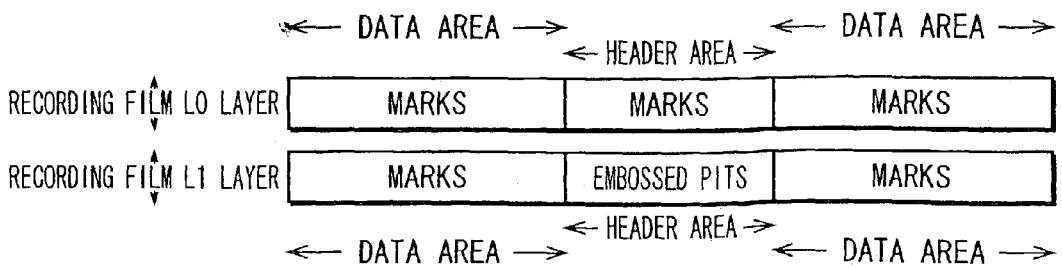
F I G. 1 5 D

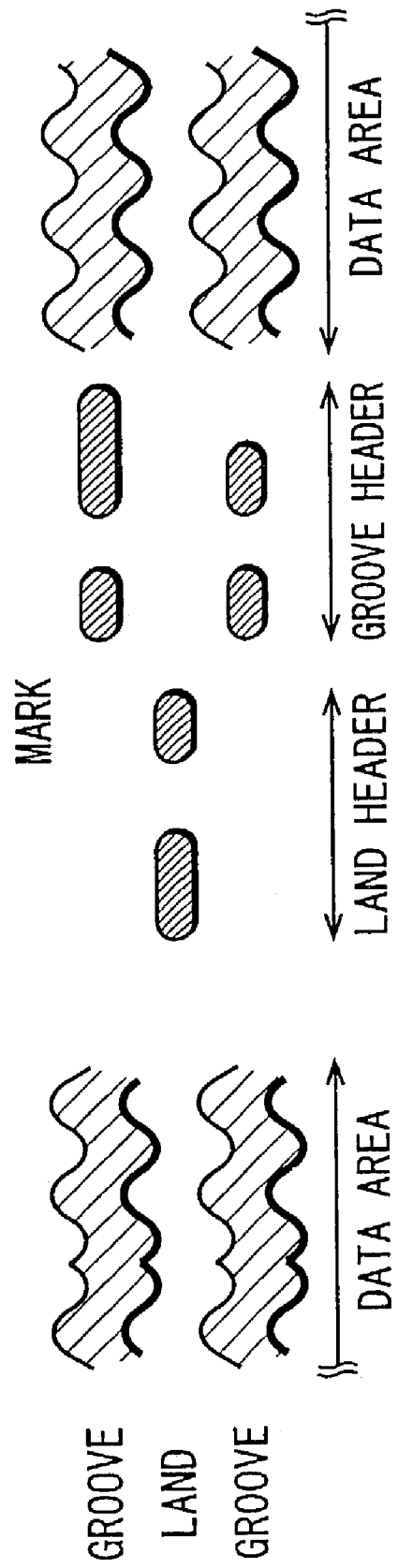

RECORDING/REPRODUCING DEVICE

TECHNICAL FIELD

This invention relates to a recording and/or reproduction apparatus, and more particularly to a recording and/or reproduction apparatus suitable for use to record and/or reproduce data onto and/or from an optical disk having two recording layers on one side thereof.

BACKGROUND ART

Development of a two-layer recording-reproduction optical disk wherein a recording film of two layers is provided on one side of an optical disk to increase the recording capacity per one side to twice is proceeding.

In the two-layer recording-reproduction optical disk, as shown in a sectional view of FIG. 1, a recording film L1 layer for recording data, a space layer, another recording film L0 layer for recording data and a cover layer for protecting the recording film L0 layer and the other layers below the recording film L0 layer are formed in an overlapping relationship with each other on a substrate of polycarbonate or the like. It is to be noted that an optical pickup (not shown) for irradiating a laser beam upon and receiving reflected light of the laser beam from the two-layer recording-reproduction optical disk is positioned at an upper location in the drawing. In the following description, where it is not necessary to distinguish the recording film L0 layer and the recording film L1 layer from each other, any of the layers may be referred to merely as recording layer.

In order to record data on a recording layer of a two-layer recording-reproduction optical disk, it is necessary to divide the recording layer into sectors of 2,048 (=2 K) bytes which are units for recording and reproduction and record a sector address into the header of each sector, that is, to perform a formatting process for the recording layer.

As a method of recording sector addresses and data on a recording layer, a method of forming pits (small holes) by stamping or the like in a process of production of a two-layer recording-reproduction optical disk and another method of irradiating a laser beam upon a recording layer of a completed two-layer recording-reproduction optical disk to record marks (phase transition regions) are known. It is to be noted that a pit formed in a process of production of a two-layer recording-reproduction optical disk is hereinafter referred to as embossed pit.

In order to record or read out a mark onto or from the recording film L1 layer of the two-layer recording-reproduction optical disk, a laser beam from the optical pickup is irradiated upon the recording film L1 layer through the recording film L0 layer or reflected light from the recording film L1 layer is received by the optical pickup through the recording film L0 layer as seen in FIG. 1.

Incidentally, a portion of a recording film at which an embossed pit or a mark is recorded has a different transmission factor or reflection factor with respect to a laser beam when compared with another portion of the recording film at which an embossed pit or a mark is not recorded.

Accordingly, when a laser beam is irradiated upon the recording film L1 layer through the recording film L0 layer or reflected light from the recording film L1 layer is received through the recording film L0 layer, a variation or an offset in amplitude occurs with the irradiation light or the reflection light in response to presence or absence of an embossed pit or a mark on the recording film L0 layer through which the laser light or the reflected light passes. Therefore, there is a subject to be solved that it is difficult to record or reproduce a mark with a high degree of accuracy onto or from the recording film L1 layer.

DISCLOSURE OF INVENTION

The present invention has been made in view of such a situation as described above, and it is an object of the present invention to make it possible to record or reproduce a mark with a high degree of accuracy onto or from a recording film L0 layer and another recording film L1 layer of a two-layer recording-reproduction optical disk.

A recording and/or reproduction apparatus of the present invention is characterized in that it includes recording means for irradiating a laser beam upon an optical disk to record marks onto a first or second recording layer, light receiving means for receiving reflected light from the optical disk when the laser beam is irradiated upon the optical disk, data signal production means for producing a data signal based on the reflected light received by the light receiving means, and control means for controlling the recording means to record the marks onto the entire first recording layer prior to the second recording layer.

The optical disk may be formed such that the laser beam irradiated upon the second recording layer and the reflected light from the second recording layer pass through the first recording layer.

The control means may control the recording means to record the marks corresponding to recording data inputted thereto onto the entire first recording layer prior to the second recording layer.

The control means may control the recording means to record the dummy marks onto the entire first recording layer after formatting for the first recording layer is completed.

Wobbles may be formed on tracks of the first and second recording layers of the optical disk.

The recording and/or reproduction apparatus of the present invention may further include wobble signal production means for producing a wobble signal corresponding to the wobbles formed on the tracks based on the reflected light signal, and adjustment means for adjusting a synchronizing signal based on the wobble signal.

A recording and/or reproduction method of the present invention is characterized in that it comprises a recording step of irradiating a laser beam upon an optical disk to record marks onto a first or second recording layer, a light receiving step of receiving reflected light from the optical disk when the laser beam is irradiated upon the optical disk, a data signal production step of producing a data signal based on the reflected light received by the process of the light receiving step, and a control step of controlling the process of the recording step to record the marks onto the entire first recording layer prior to the second recording layer.

A program of a recording medium of the present invention is characterized in that it comprises a recording step of irradiating a laser beam upon the optical disk to record marks onto the first or second recording layer, a light receiving step of receiving reflected light from the optical disk when the laser beam is irradiated upon the optical disk, a data signal production step of producing a data signal based on the reflected light received by the process of the light receiving step, and a control step of controlling the process of the recording step to record the marks onto the entire first recording layer prior to the second recording layer.

A program of the present invention is characterized in that it causes a computer to execute a recording step of irradiating a laser beam upon the optical disk to record marks onto the first or second recording layer, a light receiving step of receiving reflected light from the optical disk when the laser beam is irradiated upon the optical disk, a data signal production step of producing a data signal based on the reflected light received by the process of the light receiving step, and a control step of controlling the process of the recording step to record the marks onto the entire first recording layer prior to the second recording layer.

With the recording and/or reproduction apparatus and method as well as the program of the present invention, a laser beam is irradiated upon an optical disk to form marks on a first or second recording layer. Further, reflected light from the optical disk when the laser beam is irradiated upon the optical disk is received, and a data signal is produced based on the received reflected light. Furthermore, a recording process is controlled to record marks on the entire first recording layer prior to the second recording layer.

BRIEF DESCRIPTION OF THE DRAWINGS

FIG. 2 is a view illustrating a structure of a two-layer recording-reproduction optical disk 1;

FIG. 3 is a view showing a data structure of a header;

FIG. 15A is a view showing the optical disk 1 in an unformatted state;

FIG. 15B is a view showing the optical disk 1 wherein a header is recorded on the recording film L0 layer;

FIG. 15C is a view showing the optical disk 1 wherein data are recorded on the entire recording film L0 layer;

FIG. 15D is a view showing the optical disk 1 wherein data are recorded also on the recording film L1 layer;

FIG. 16 is a view showing the recording film L0 layer of the optical disk 1 in a formatted state;

BEST MODE FOR CARRYING OUT THE INVENTION

In the following, an optical disk drive of an embodiment of the present invention is described. However, before the optical disk drive is described, a two-layer recording-reproduction optical disk 1 to be loaded into the optical disk drive (FIG. 6) so that data are recorded onto it is described with reference to FIGS. 2 to 5.

Figure 1:
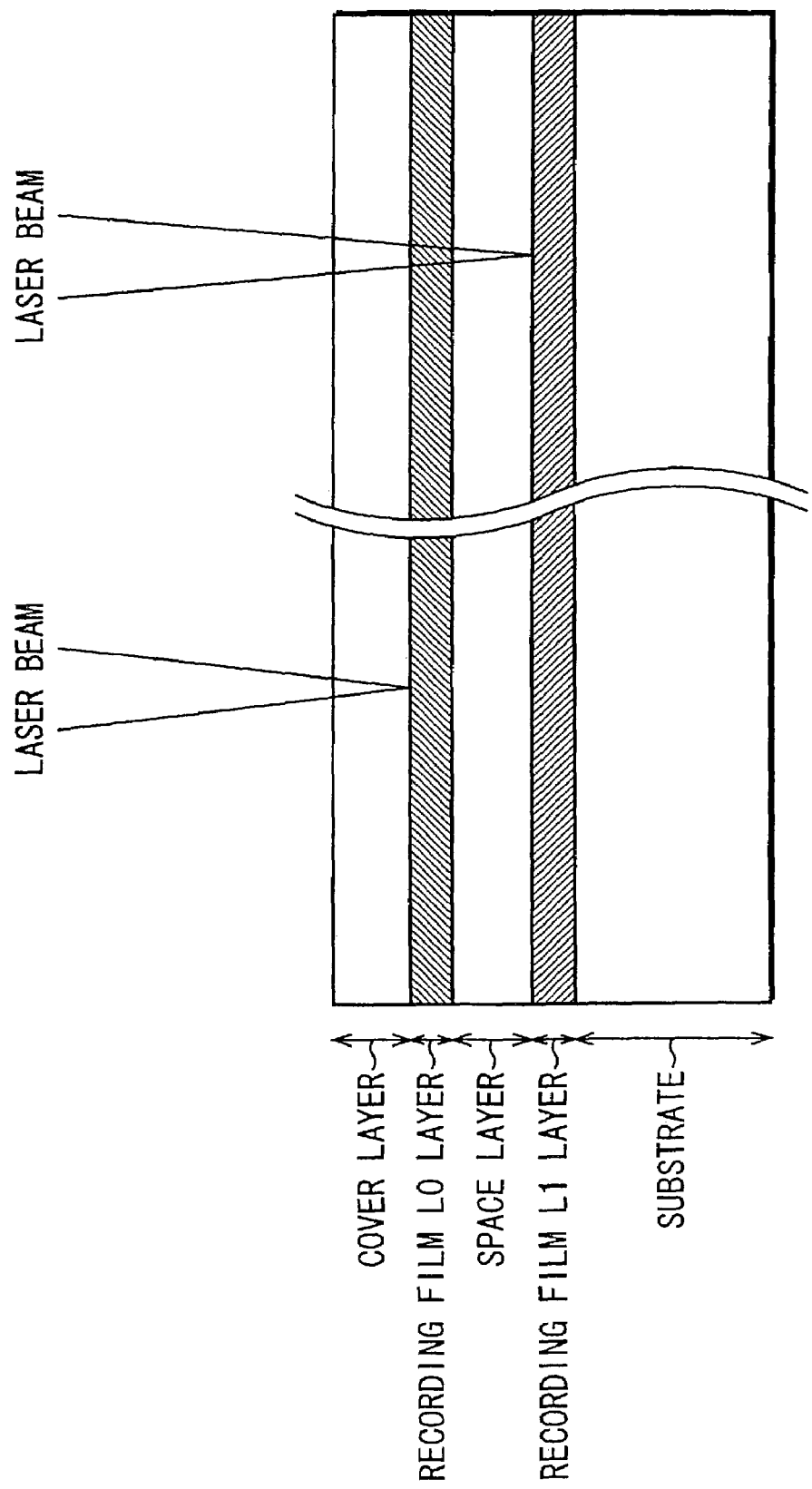
FIG. 1 is a sectional view of a two-layer recording-reproduction optical disk.

The optical disk (hereinafter referred to simply as optical disk) 1 includes a substrate, a recording film L1 layer, a space layer, a recording film L0 layer and a cover layer placed one on another in this order as shown in FIG. 1.

FIG. 2 shows a recording layer (the recording film L0 layer and the recording film L1 layer) of the optical disk 1. A spiral groove (guide groove) wobbled with a fixed frequency is formed on the recording layers of the optical disk. Accordingly, a track formed from a groove and another track formed from a land are formed alternately for every one circumference. The wobbles are detected based on a pp (push pull) signal and are used to produce a synchronizing signal.

A track for one circumference of the optical disk 1 is composed of eight segments. Each of the segments is composed of a head area in which a header is recorded and a data area in which data are recorded.

The optical disk 1 is sectioned into n+1 zones $Z_0$ to $Z_n$ composed of a plurality of tracks which are adjacent each other in a radial direction. The number (period) of wobbles formed on tracks which belong to the same zone is common. In particular, wobbles for 420+6i periods are formed in each of segments in the ith (i=0, 1, ..., n) zone $Z_i$ from the inner side. Accordingly, wobbles for 8×(420+6i) periods are formed on the tracks which belong to the zone $Z_i$.

For example, in each segment in the zone $Z_0$ of the innermost circumference, wobbles for 420 periods are formed. Accordingly, on the tracks which belong to the zone $Z_0$, wobbles for 3,360 (=420×8) periods are formed. Meanwhile, for example, in each segment of the third (i=2) zone $Z_2$, wobbles for 432 (=420+6×2) periods are formed. Accordingly, wobbles for 3,456 (=8×(420+6×2)) periods are formed on the tracks which belong to the zone $Z_2$.

The wavelengths of the wobbles formed on the innermost tracks in the different zones are equal to one another. Addresses recorded in a header area are formed in a CAV (Constant Angular Velocity) state, that is, in a radial state in each zone. The densities on the innermost circumferences in the different zones are equal to one another.

FIG. 3 illustrates a configuration of information of 1,080 ch recorded with embossed pits or marks in a header area of a segment.

A segment mark SM1 of 60 ch is a unique pattern representing that it is a header. VFO1 of 414 ch is a continuous data pattern for PLL (Phase Locked Loop) pull-in. A preamble PrA1 of 30 ch is a pattern for automatic gain control and offset control. An address mark AM1 of 21 ch is a pattern representative of the top of ID1 which indicates an address. The address ID1 of 102 ch indicates a track address, a segment address and a CRC (Cyclic Redundancy Check) code. A postamble PoA1 of 6 ch is a pattern for causing the address ID1 to satisfy a channel coding rule.

VFO2 of 288 ch is a continuous data pattern for PLL pull-in. A preamble PrA2 of 30 ch is a pattern for automatic gain control and offset control. An address mark AM2 of 21 ch is a pattern representative of the top of ID2 representative of an address. The address ID2 of 102 ch indicates a track address, a segment address and a CRC code. A postamble PoA2 of 6 ch is a pattern for causing the address ID2 to satisfy a channel coding rule.

The address ID1 and the address ID2 are provided in the header area. Accordingly, an address is recorded doubly in the header area.

Figure 4:
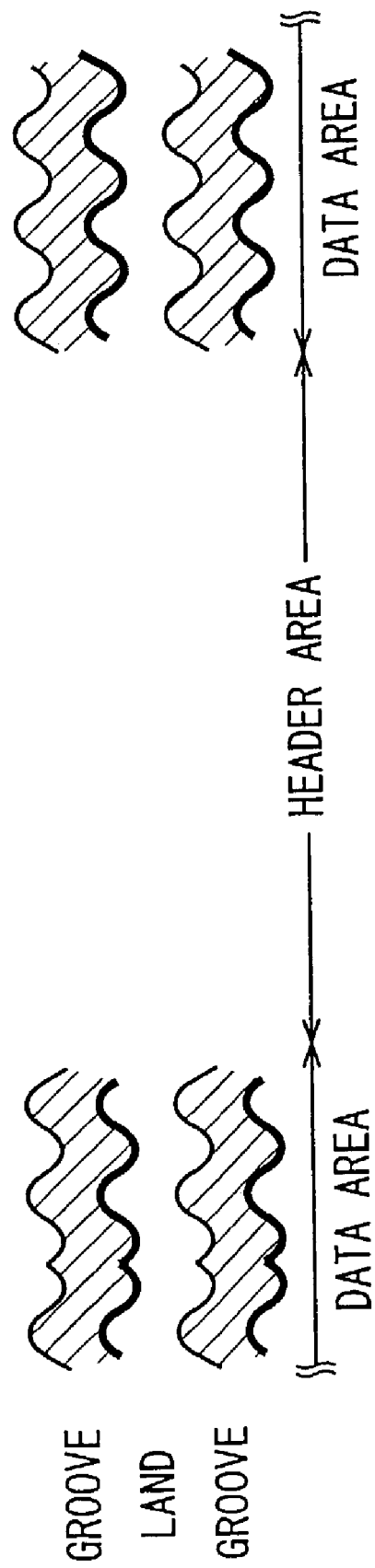
FIG. 4 is a view showing a recording film L0 layer of the two-layer recording-reproduction optical disk 1 in an unformatted state.

FIG. 4 shows a header area and data areas around the header area of the recording film L0 layer of the optical disk 1 for which a formatting process has not been performed by the optical disk drive to which the present invention is applied. As shown in FIG. 4, wobbles immediately prior to a header area are formed such that their phase is reversed two periods before the header area. In the header area, a header address by embossed pits or marks is not recorded as yet. In the following description, a header area in a state wherein no embossed pit or no mark is recorded is referred to as mirror mark.

Figure 5:
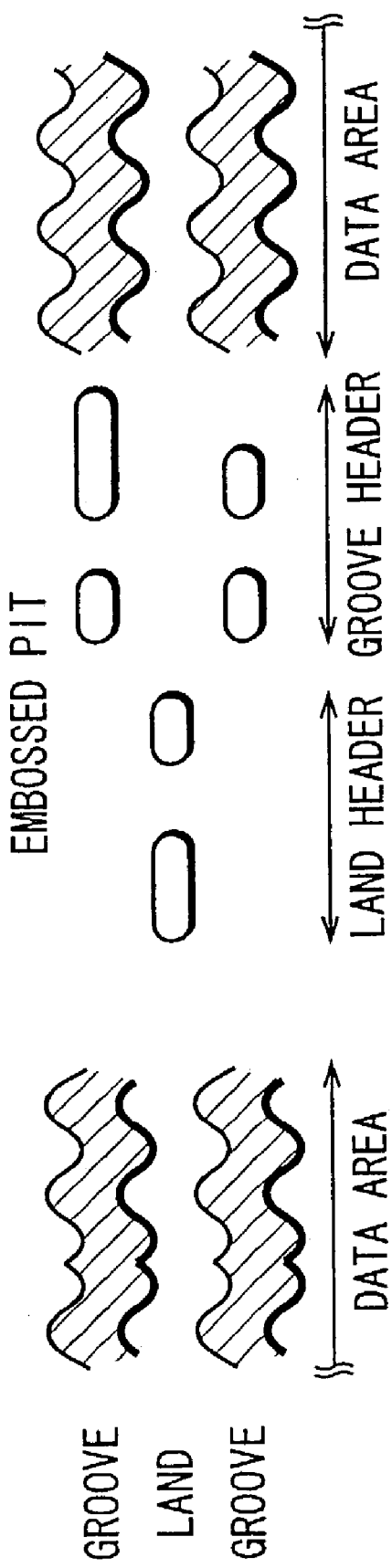
FIG. 5 is a view showing a recording film L1 layer of the two-layer recording-reproduction optical disk 1 in an unformatted state.

FIG. 5 shows a header area and data areas around the header area of the recording film L1 layer of the optical disk 1 for which a formatting process has not been performed by the optical disk drive to which the present invention is applied. As shown in FIG. 5, wobbles immediately prior to a header area are formed such that their phase is reversed two periods before the header area. On a land of the header area, a header address by embossed pits is formed. Meanwhile, on a groove of the header area, a groove header by embossed pits is formed such that it does not neighbor with a land header in a radial direction.

As can be seen apparently from comparison between FIGS. 4 and 5, nothing is recorded in the header areas of the recording film L0 layer which composes the optical disk 1 before a formatting process is performed therefor by the optical disk drive to which the present invention is applied. However, on the recording film L1 layer, land headers and groove headers by embossed pits are formed in the header areas. In other words, the recording film L0 layer which composes the optical disk 1 remains in an unformatted state while the recording film L1 layer is formatted in the process of production of the optical disk 1.

In the following, an example of a configuration of the optical disk drive which records or reproduces data onto or from the optical disk 1 described above is described with reference to FIG. 6.

In the optical disk drive shown, a control circuit 2 controls components of the optical disk drive based on a controlling program of a recording medium 16. More particularly, the control circuit 2 controls the components of the optical disk drive in accordance with a recording command inputted from an external AV apparatus or the like (not shown) through an AV interface 3 to record marks corresponding to recording data inputted from the AV apparatus or the like onto the optical disk 1. Further, the control circuit 2 controls the components of the optical disk drive in accordance with a reproduction command inputted from the external AV apparatus or the like through the AV interface 3 to read out marks recorded on the optical disk 1 to reproduce the recorded data and output the reproduced data to the external AV apparatus or the like through the AV interface 3.

A spindle circuit 4 controls rotation of a spindle motor 6 in accordance with an instruction from the control circuit 2. A servo circuit 5 controls an optical pickup 7 to seek an address designated by the control circuit 2 and controls focusing servoing and tracking servoing of the optical pickup 7 in accordance with a focusing error signal and a tracking error signal inputted from an optical head circuit 8. The spindle motor 6 drives the optical disk 1 to rotate under the control of the spindle circuit 4.

The optical pickup 7 including a laser outputting system, a reflected light receiving system, a two-axis actuator and so forth irradiates, upon recording, a laser beam upon a recording layer of the optical disk 1 to form marks on the recording layer under the control of the optical head circuit 8. Further, upon recording and reproduction, the optical pickup 7 irradiates a laser beam upon a recording layer of the optical disk 1, receives reflected light of the laser beam from the recording layer of the optical disk 1 to produce a corresponding reflection light signal, and outputs the reflection light signal to the optical head circuit 8.

The optical head circuit 8 controls, upon recording, the laser beam output of the optical pickup 7 in accordance with a header signal or a recording-compensated binary signal inputted from a recording and reproduction circuit 9. Upon reproduction, the optical head circuit 8 produces an RF signal corresponding to embossed pits or marks recorded on the optical disk 1 based on the reflection light signal from the optical pickup 7 and outputs the RF signal to the recording and reproduction circuit 9. Further, upon recording and reproduction, the optical head circuit 8 produces and outputs a focusing error signal and a tracking error signal based on the reflection light signal from the optical pickup 7 to the servo circuit 5, and produces and outputs a pp signal to a wobbling circuit 12 and a header area detection circuit 14.

The recording and reproduction circuit 9 supplies, upon formatting, a header signal inputted thereto from an address encoder (ENC) 15 to the optical head circuit 8 under the control of the control circuit 2. On the other hand, upon recording, the recording and reproduction circuit 9 performs recording compensation for a binary signal from a modulation-demodulation circuit 10 and supplies a resulting signal to the optical head circuit 8. Further, upon reproduction, the recording and reproduction circuit 9 converts the RF signal from the optical head circuit 8 into binary data and supplies the binary data to the modulation-demodulation circuit 10.

The modulation-demodulation circuit 10 modulates, upon recording, recording data with error correction codes inputted from an error correction circuit 11 under the control of the control circuit 2 and outputs a resulting binary signal to the recording and reproduction circuit 9. Further, upon reproduction, the modulation-demodulation circuit 10 demodulates a binary signal from the recording and reproduction circuit 9 and outputs resulting reproduction data to the error correction circuit 11.

The error correction circuit 11 adds, upon recording, ECCs (Error Correction Codes) to recording data supplied from the external AV apparatus or the like through the AV interface 3 under the control of the control circuit 2 and outputs resulting data to the modulation-demodulation circuit 10. Further, upon reproduction, the error correction circuit 11 corrects errors of reproduction data inputted from the modulation-demodulation circuit 10 based on ECCs and outputs resulting data to the external AV apparatus or the like through the AV interface 3.

The wobbling circuit 12 produces a channel clock signal by means of a PLL mechanism built therein in accordance with the pp signal inputted from the optical head circuit 8 and outputs the channel clock signal to a address decoder-timing generator (DEC•TG) 13, the header area detection circuit 14 and the address encoder 15.

The address decoder-timing generator 13 decodes, upon reproduction, the RF signal from the optical head circuit 8 to detect an address and outputs resulting address information to the control circuit 2 and further outputs a resulting wobble enable signal to the wobbling circuit 12. Further, the address decoder-timing generator 13 produces a timing signal based on a channel clock signal inputted from the wobbling circuit 12 and supplies the timing signal to the components of the optical disk drive through the control circuit 2.

The header area detection circuit 14 detects a header area of a recording layer based on the pp signal inputted from the optical head circuit 8 and the channel clock signal inputted from the wobbling circuit 12 and outputs information of the header area to the address encoder 15.

The address encoder 15 produces, upon formatting, an address to be recorded into a header area detected by the header area detection circuit 14, encodes the address and outputs a resulting header signal to the recording and reproduction circuit 9.

Figure 7:
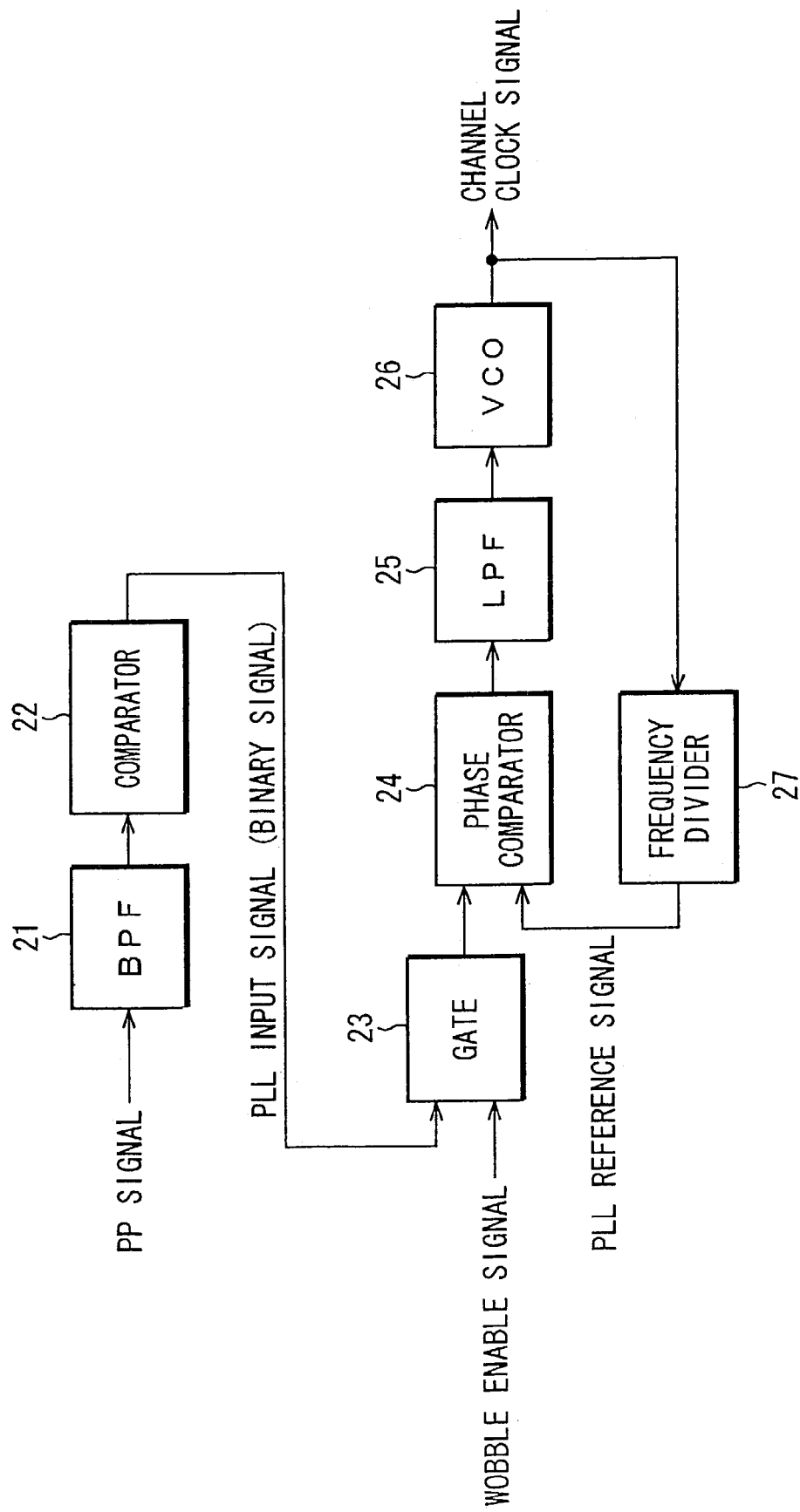
FIG. 7 is a block diagram showing an example of a configuration of a wobbling circuit 12.

FIG. 7 shows an example of a configuration of the PLL mechanism of the wobbling circuit 12 for producing the clock signal.

A band-pass filter (BPF) 21 extracts only a wobble frequency component from within the pp signal inputted from the optical head circuit 8 and outputs a resulting wobble signal to a comparator 22. It is to be noted that a high-pass filter may be used in place of the band-pass filter 21. The comparator 22 compares the wobble signal with a predetermined threshold value to convert the wobble signal into a binary signal and outputs the binary signal as a PLL input signal to a gate 23.

The gate 23 outputs the PLL input from the comparator 22 in response to the wobble enable signal from the address decoder-timing generator 13 to a phase comparator 24. The phase comparator 24 produces a phase difference signal representative of a phase difference between the PLL input signal inputted from the gate and a PLL reference signal inputted from a frequency divider 27 and outputs the phase difference signal to a low-pass filter (LPF) 25. The low-pass filter 25 removes high frequency components of the phase difference signal and outputs a resulting signal to a VCO (Voltage Controlled Oscillator) 26. The VCO 26 oscillates a clock signal with a frequency and a phase thereof adjusted so that the voltage of the phase difference signal may be reduced to 0. The frequency divider 27 divides the clock signal oscillated by the VCO 26 and outputs a resulting PLL reference signal to the phase comparator 24.

Figure 8:
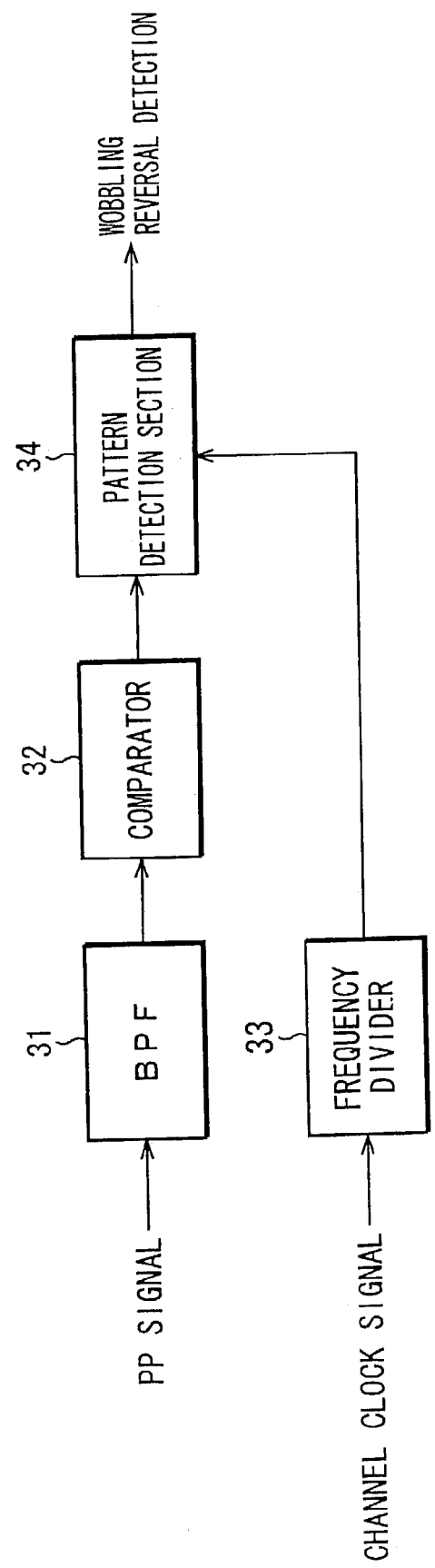
FIG. 8 is a block diagram showing a first example of a configuration of a header area detection circuit 14.

FIG. 8 shows a first example of a configuration of the header area detection circuit 14. The first example of the configuration detects a header area based on the fact that the phase of periodic waveform of wobbles formed on a track is reversed at a timing two periods before a header area.

Figure 9:
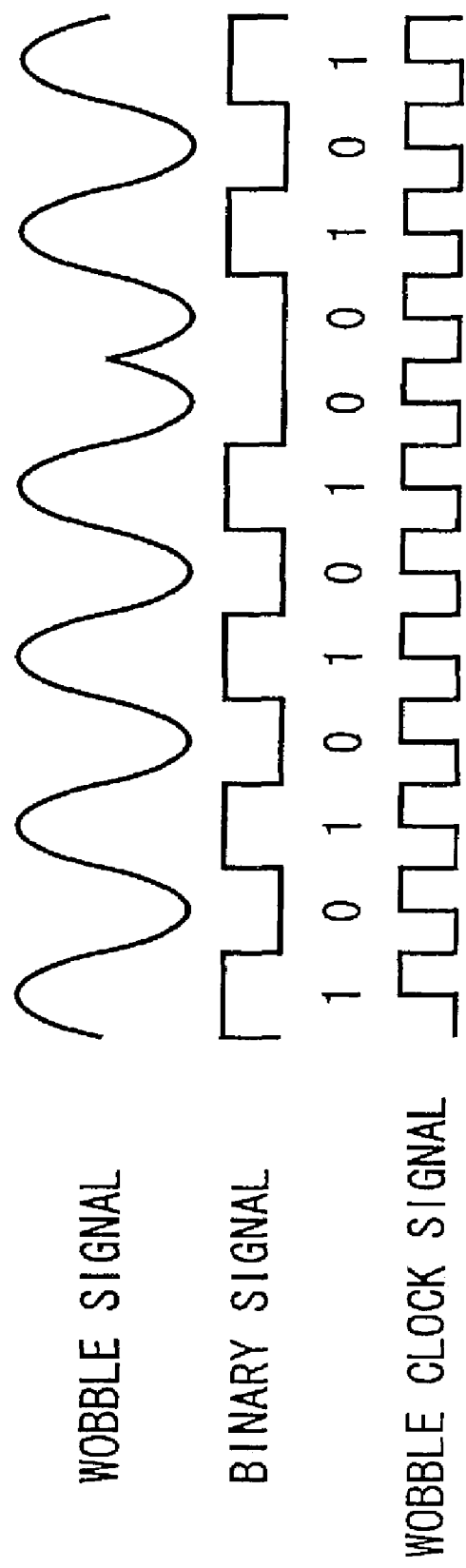
FIG. 9 is a view illustrating operation by the first example of the configuration of the header area detection circuit 14.

A band-pass filter 31 extracts only a wobble frequency component of the pp signal inputted from the optical head circuit 8 and outputs such a resulting wobble signal as shown in the first stage of FIG. 9 to a comparator 32. It is to be noted that a high-pass filter may be used in place of the band-pass filter 21. The comparator 32 compares the wobble signal with a predetermined threshold value to convert the wobble signal into such a binary signal wherein 0 and 1 appear alternately as shown in the second stage of FIG. 9 and outputs the binary signal to a pattern detection section 34.

A frequency divider 33 divides the channel clock signal inputted from the wobbling circuit 12 and outputs such a resulting wobble clock signal as shown in the third stage of FIG. 9 to the pattern detection section 34. The pattern detection section 34 supervises the binary signal from the comparator 32 in synchronism with the wobble clock signal from the frequency divider 33 and outputs, when it detects a phase inversion of the wobble periodic waveform, information representing that a header area is present after two periods of the wobbles to the address encoder 15.

Figure 10:
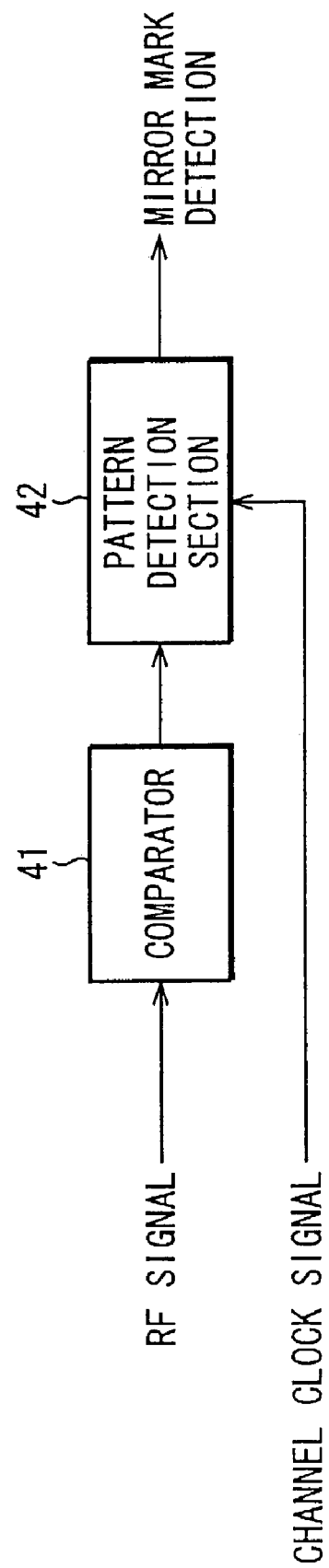
FIG. 10 is a block diagram showing a second example of a configuration of the header area detection circuit 14.

FIG. 10 shows a second example of a configuration of the header area detection circuit 14. The second example of the configuration detects a header area based on the fact that an embossed pit or a mark is not recorded in a header area in an unformatted state, that is, an unformatted header area is a mirror mark.

Figure 11:
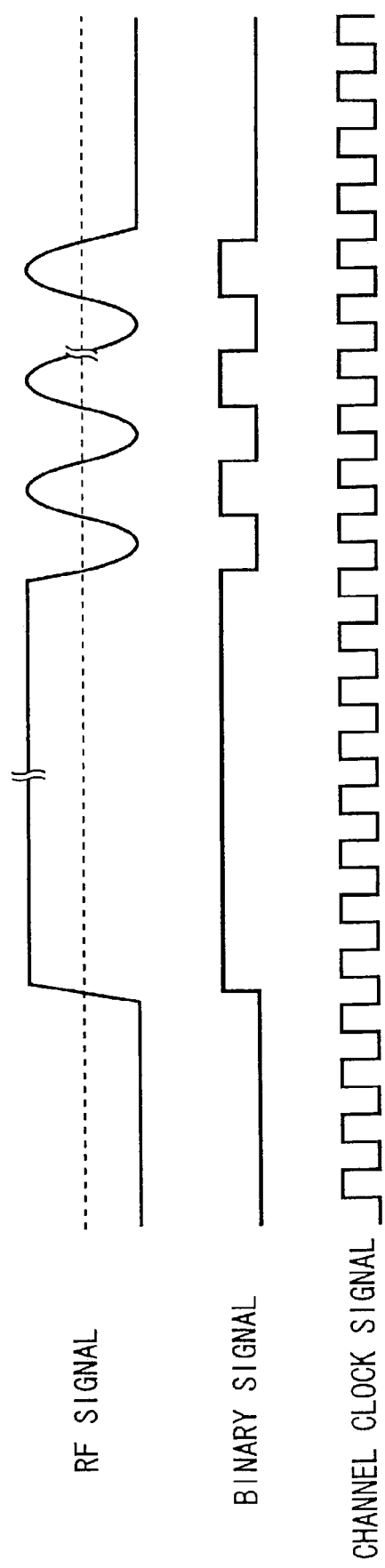
FIG. 11 is a view illustrating operation by the second example of the configuration of the header area detection circuit 14.

A comparator 41 compares such an RF signal acquired from the optical head circuit 8 as shown in the first stage of FIG. 11 with a predetermined threshold value to convert the RF signal into such a binary signal as shown in the second stage of FIG. 11 and outputs the binary signal to a pattern detection section 42. The pattern detection section 42 supervises the binary signal from the comparator 41 in synchronism with such a channel clock signal inputted from the wobbling circuit 12 as shown in the third stage of FIG. 11 and discriminates, when a state wherein the binary signal indicates one of the values continues for more than a predetermined period, that a mirror mark is detected, and outputs information indicating that a header area is present to the address encoder 15.

Figure 12:
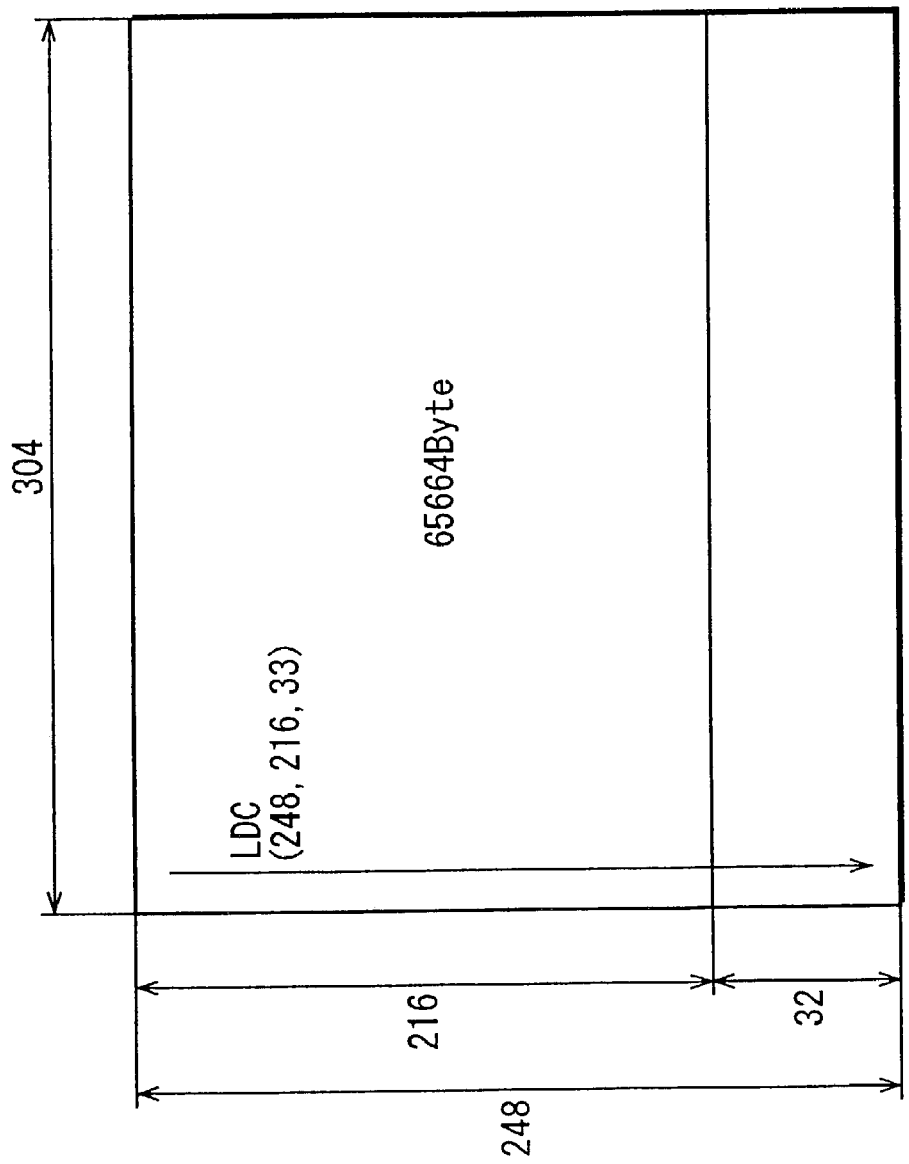
FIG. 12 is a view showing a configuration of an error correction block.

FIG. 12 shows a configuration of an error correction block. The error correction block is formed for each data of 64 Kbytes. The error correction block can be handled as a recording-reproduction 2 K data sector. In this instance, recording and reproduction are performed with an error correction block which includes 64 Kbytes as a unit, and an arbitrary 2 K data sector of the error correction block is recorded and reproduced. An error correction code is composed of data of 216 symbols and a parity of 32 symbols. The error correction block is composed of 304 error correction codes.

Figure 13:
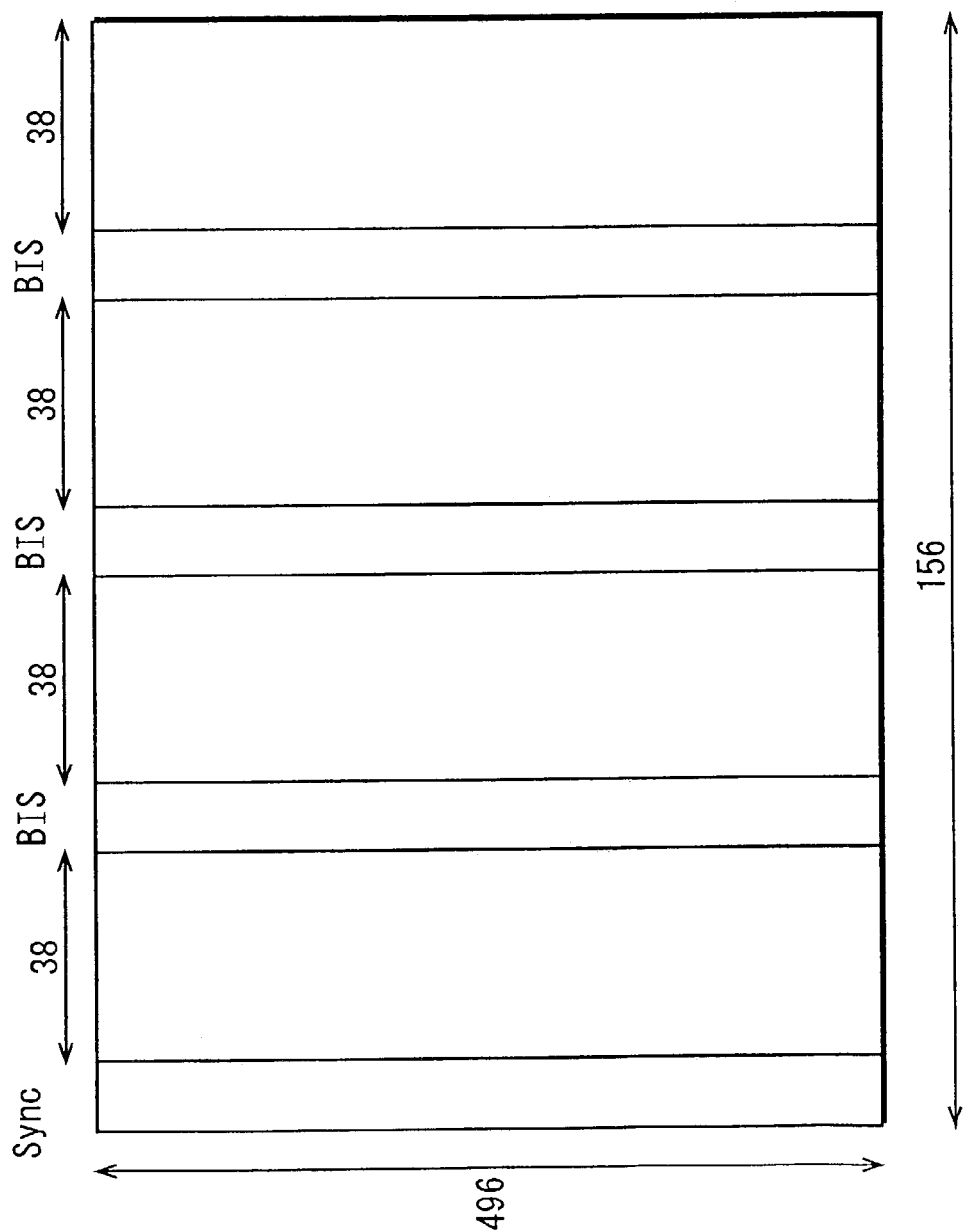
FIG. 13 is a view showing an ECC block cluster.

FIG. 13 shows an ECC block cluster. Referring to FIG. 13, recording and reproduction are performed in a horizontal direction. In a BIS (Burst Indicator Subcode), when successive data symbols are errors together with sync which is a synchronizing signal, data symbols sandwiched between the sync and the BIS are regarded as burst errors and a pointer is added thereto. For the data symbols to which the pointer is added, pointer erasure correction is performed with a main correction code LCD (Long Distance Code) (248, 216, 33) illustrated in FIG. 12.

Figure 14:
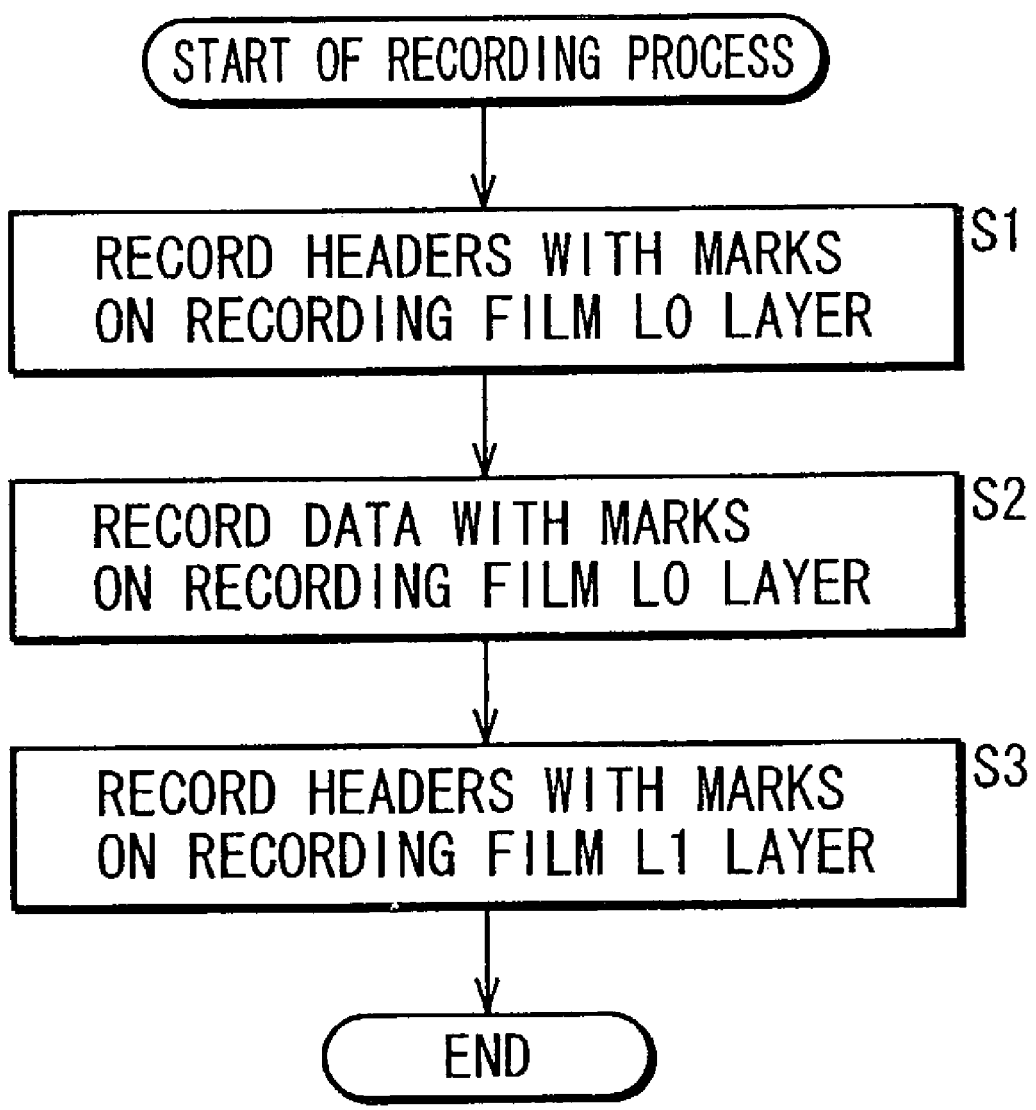
FIG. 14 is a flow chart illustrating a recording process of the optical disk drive.

Now, a data recording process for the optical disk 1 for which a formatting process has not been performed by the optical disk drive to which the present invention is applied is described with reference to a flow chart of FIG. 14.

It is to be noted that, in the optical disk 1 for which a formatting process has not been performed by the optical disk drive to which the present invention is applied, land headers and groove headers by embossed pits are recorded in the header areas of the recording film L1 layer as shown in FIG. 15A in the process of production of the optical disk 1. In other words, while the recording film L0 layer of the optical disk 1 remains in an unformatted state, the recording film L1 layer is in a formatted state.

At step S1, the optical disk drive detects the header areas of the recording film L0 layer of the optical disk 1, records groove headers with marks onto the groove as seen in FIG. 16 and records land headers with marks onto the land.

More particularly, the header area detection circuit 14 detects the header areas of the recording film L0 layer based on the pp signal inputted from the optical head circuit 8 and the channel clock signal inputted from the wobbling circuit 12 and outputs information of the header areas to the address encoder 15, and the address encoder 15 produces and encodes the addresses and outputs a resulting header signal to the recording and reproduction circuit 9. Further, the recording and reproduction circuit 9 supplies the header signal to the optical head circuit 8, and the optical head circuit 8 controls the laser output of the optical pickup 7 in response to the header signal. Then, the optical pickup 7 irradiates a laser beam under the control of the optical head circuit 8 to record groove headers on the groove of the header areas of the recording film L0 layer and record land headers onto the land.

After the headers are recorded with marks into the header areas of the recording film L0 layer as shown in FIG. 15B by the process at step S1 to place the optical disk 1 into a formatted state, the optical disk drive starts, at step S2, formation of marks corresponding to recording data onto the recording film L0 layer and the recording film L1 layer of the optical disk 1 beginning with the recording film L0 layer.

More particularly, the error correction circuit 11 adds error correction codes to recording data inputted from the AV apparatus or the like through the AV interface 3, and the modulation-demodulation circuit 10 modulates a resulting signal into a binary signal. Then, the recording and reproduction circuit 9 performs recording compensation for the binary signal, and the optical pickup 7 irradiates a laser beam under the control of the optical head circuit 8 to form marks corresponding to the recording data onto the recording film L0 layer.

Then, after the recording film L0 layer is used up (after marks are recorded into all data area of the recording film L0 layer) as shown in FIG. 15C, the optical disk drive forms marks corresponding to the recording data onto the recording film L1 layer as shown in FIG. 15D.

Figure 17:
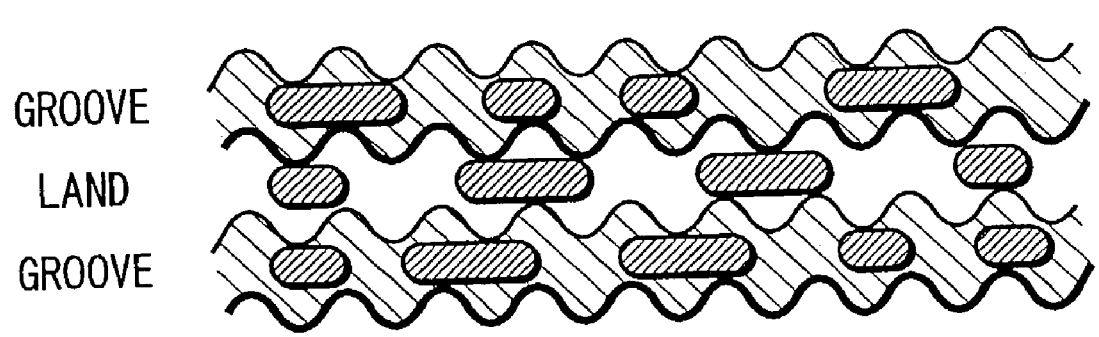
FIG. 17 is a view illustrating land groove recording.
Figure 18:
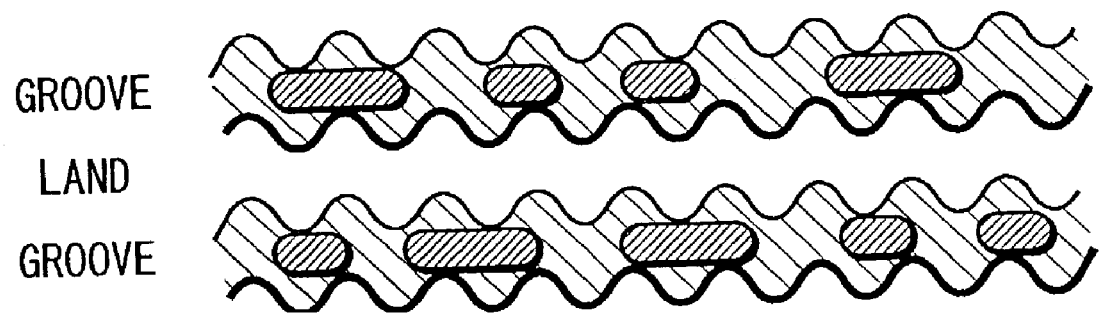
FIG. 18 is a view illustrating groove recording.

It is to be noted that, as a method of forming marks in a data area, two methods including a method of forming marks on both of a land and a groove as illustrated in land-groove recording in FIG. 17 and another method of forming marks on only one of a land and a groove as in groove recording illustrated in FIG. 18 are available.

As described above, with the optical disk drive to which the present invention is applied, at a point of time at which marks are formed on the recording film L1 layer, marks are already formed in all of the header areas and the data areas of the recording film L0 layer while no emboss pit is formed on the recording film L0 layer. Therefore, the transmission factor of the recording film L0 layer is uniform. Accordingly, incoming light to the recording film L1 layer or reflected light from the recording film L1 layer which passes through the recording film L0 layer does not include a change or an offset of the amplitude which arises from presence or absence of marks or embossed pits, and therefore, marks corresponding to recording data can be formed onto or reproduced from the recording film L1 layer accurately.

It is to be noted that, in order to record data again onto the optical disk 1 whose recording film L0 layer has been placed into a formatted state once, the processing at step S2 et seq. should be executed.

Further, dummy marks may be recorded into all of the data areas of the recording film L0 layer continuously to the processing of formatting the recording film L0 layer at step S1.

With the optical disk drive to which the present invention is applied, since a PLL is applied to a frequency based on wobbles formed on the optical disk 1 to produce a channel clock signal, the entire optical disk driven can operate with a high degree of accuracy.

Further, with the optical disk drive to which the present invention is applied, since an accurate synchronizing signal is obtained based on the wobbles, for example, even if an influence of dust or the like sticking to the surface of the optical disk 1 increases due to the fact that the cover layer is formed with such a small thickness as approximately 0.1 mm to such a degree that an embossed pit or a mark is read erroneously, error correction can be executed readily.

Figure 6:
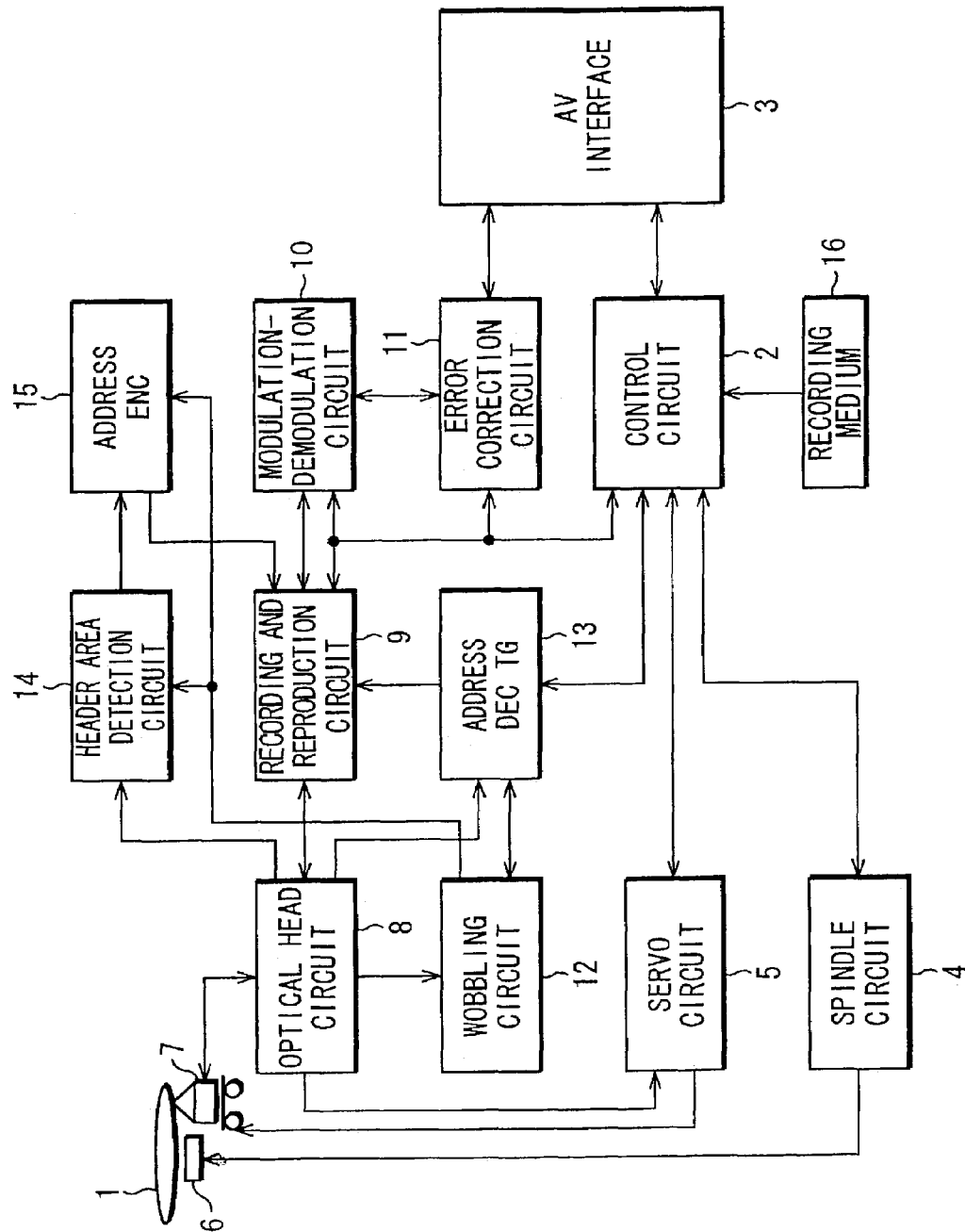
FIG. 6 is a block diagram showing an example of a configuration of an optical disk drive of an embodiment of the present invention.

It is to be noted that, where the optical disk drive is used as an apparatus for recording only headers with marks into the header areas of the recording film L0 layer of the optical disk 1 in order to sold the optical disk 1 in a formatted state, the AV interface 3, modulation-demodulation circuit 10 and error correction circuit 11 can be removed from the example of the configuration shown in FIG. 6.

Incidentally, while the series of processes described above can be executed by hardware, it may otherwise be executed by software. Where the series of processes is executed by software, a program which constructs the software is installed from a recording medium into a computer incorporated in hardware for exclusive use or, for example, a personal computer for universal use which can execute various functions by installing various programs.

The recording medium is formed as a package medium such as, as shown in FIG. 6, a magnetic disk (including a floppy disk), an optical disk (including a CD-ROM (Compact Disc-Read Only Memory) and a DVD (Digital Versatile Disc)), or a magneto-optical disk (including an MD (Mini Disk)), or a ROM, a hard disk or the like in which the program is recorded and which is provided to a user in a state wherein the program is incorporated in a computer.

It is to be noted that, in the present specification, the steps which describe the program recorded in a recording medium may be but need not necessarily be processed in a time series in the order as described, and include processes which are executed in parallel or individually without being processed in a time series.

INDUSTRIAL APPLICABILITY

As described above, according to the present invention, marks can be recorded and reproduced with a high degree of accuracy onto and from a recording film L0 layer and a recording film L1 layer of a two-layer recording-reproduction optical disk.

The invention claimed is:

1. A recording and/or reproduction apparatus for recording or reproducing data onto or from an optical disk having a first recording layer and a second recording layer on one side thereof, the second layer having a pre-formatted header, comprising:

recording means for irradiating a laser beam upon the optical disk to record marks onto the first or second recording layer;

light receiving means for receiving reflected light from the optical disk when the laser beam is irradiated upon the optical disk;

data signal production means for producing a data signal based on the reflected light received by said light receiving means; and control means for controlling said recording means to record marks for a header and marks for data on the first recording layer before marks for data are recorded on the second recording layer which has marks for a header already formed thereon, the marks for the header including a segment mark, marks corresponding to a first address and marks corresponding to a second address, and said control means controls said recording means to record the dummy marks onto the first recording layer after recording the marks for the header.

2. The recording and/or reproduction apparatus according to claim 1, wherein the optical disk is formed such that the laser beam irradiated upon the second recording layer and the reflected light from the second recording layer pass through the first recording layer.

3. The recording and/or reproduction apparatus according to claim 1, wherein said control means controls said recording means to record the marks corresponding to recording data inputted thereto onto the entire first recording layer prior to the second recording layer.

4. The recording and/or reproduction apparatus according to claim 1, wherein wobbles are formed on tracks of the first and second recording layers of the optical disk.

5. The recording and/or reproduction apparatus according to claim 1, further comprising:
wobble signal production means for producing a wobble signal corresponding to the wobbles formed on the tracks based on the reflected light signal; and
adjustment means for adjusting a synchronizing signal based on the wobble signal.

6. The recording and/or reproduction apparatus according to claim 1, wherein the first and second address data includes a track address, a segment address and a CRC code.

7. A recording and/or reproduction method for a recording and/or reproduction apparatus for recording or reproducing data onto or from an optical disk having a first recording layer and a second recording layer on one side thereof, the second layer having a pre-formatted header, comprising:
irradiating a laser beam upon the optical disk to record marks onto the first or second recording layer;
receiving reflected light from the optical disk when the laser beam is irradiated upon the optical disk;
producing a data signal based on the reflected light received; and
controlling the irradiation to record marks for a header and then marks for data on the first recording layer before marks for data are recorded on the second recording layer which has marks for a header already formed thereon, the marks for the header including a segment mark, marks corresponding to a first address and marks corresponding to a second address, and, recording dummy marks onto the first recording layer after recording the marks for the header.

8. The recording and/or reproduction method according to claim 7, wherein the first and second address data includes a track address, a segment address and a CRC code.

9. A computer readable medium, including computer program instructions for causing a computer to implement a method of recording or reproducing data onto or from an optical disk having a first recording layer and a second recording layer on one side thereof, the second layer having a pre-formatted header, comprising:
irradiating a laser beam upon the optical disk to record marks onto the first or second recording layer;
receiving reflected light from the optical disk when the laser beam is irradiated upon the optical disk;
producing a data signal based on the reflected light received; and
controlling the irradiation to record marks for a header and then marks for data on the first recording layer before marks for data are recorded on the second recording layer which has marks for a header already formed thereon, the marks for the header including a segment mark, marks corresponding to a first address and marks corresponding to a second address, and, recording dummy marks onto the entire first recording layer after recording the marks for the header.

10. The computer readable medium according to claim 9, wherein the first and second address data includes a track address, a segment address and a CRC code.

11. An apparatus for recording or reproducing data onto or from an optical disk having a first recording layer and a second recording layer on one side thereof, the second layer having a pre-formatted header, comprising:
a recorder configured to irradiate a laser beam upon the optical disk to record marks onto the first or second recording layer;
a light receiving mechanism configured to receive reflected light from the optical disk when the laser beam is irradiated upon the optical disk;
a data signal production mechanism configured to produce a data signal based on the reflected light received by the light receiving mechanism; and
a controller configured to control the recording mechanism to record marks for a header and record marks for data on the first recording layer before marks for data are recorded on second recording layer which has marks for a header already formed thereon, the marks for the header including a segment mark, marks corresponding to a first address and marks corresponding to a second address, and said control means controls said recording means to record the dummy marks onto the first recording layer after recording the marks for the header.

12. The apparatus of claim 11, wherein the optical disk is formed such that the laser beam irradiated upon the second recording layer and the reflected light from the second recording layer pass through the first recording layer.

13. The apparatus of claim 11, wherein the controller is configured to control the recording mechanism to record the marks for the data input thereto onto the entire first recording layer prior to the second recording layer.

14. The apparatus according to claim 11, wherein wobbles are formed on tracks of the first and second recording layers of the optical disk.

15. The apparatus of claim 11, further comprising:
a wobble signal production mechanism configured to produce a wobble signal corresponding to wobbles formed on tracks based on the reflected light signal; and
an adjustment mechanism configured to adjust a synchronizing signal based on the wobble signal.

16. The apparatus according to claim 11, wherein the first and second address data includes a track address, a segment address and a CRC code.

* * * * *